US010263498B2

(12) United States Patent
Takei

(10) Patent No.: US 10,263,498 B2
(45) Date of Patent: Apr. 16, 2019

(54) COOLED STATOR WINDING WITH TEMPERATURE DETECTION ELEMENT CONFIGURATION FOR IMPROVED ACCURACY

(71) Applicant: DENSO CORPORATION, Kariya, Aichi-pref. (JP)

(72) Inventor: Toshihiro Takei, Seto (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 14/794,139

(22) Filed: Jul. 8, 2015

(65) Prior Publication Data

US 2016/0013705 A1 Jan. 14, 2016

(30) Foreign Application Priority Data

Jul. 8, 2014 (JP) .................................. 2014-140236

(51) Int. Cl.
*H02K 11/25* (2016.01)
*H02K 9/19* (2006.01)
*H02K 11/27* (2016.01)
*H02K 9/193* (2006.01)
*H02K 9/20* (2006.01)

(52) U.S. Cl.
CPC ............... *H02K 11/25* (2016.01); *H02K 9/19* (2013.01); *H02K 9/193* (2013.01); *H02K 9/20* (2013.01); *H02K 11/27* (2016.01)

(58) Field of Classification Search
CPC ............ H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22; H02K 9/24; H02K 9/26; H02K 9/28; H02K 11/25; H02K 11/27
USPC ...... 310/52, 53, 54, 55, 56, 57, 58, 59, 60 R, 310/60 A, 64, 68 C, 68 B
See application file for complete search history.

(56) References Cited

U.S. PATENT DOCUMENTS

| 9,735,659 B2 * | 8/2017 | Koizumi ................ H02K 11/25 |
| 2012/0086292 A1 * | 4/2012 | Ishida .................... H02K 11/25 310/71 |
| 2014/0056726 A1 * | 2/2014 | Garrard .................. H02K 9/19 417/228 |

FOREIGN PATENT DOCUMENTS

JP 2008-131775 A 6/2008

* cited by examiner

Primary Examiner — Bernard Rojas
Assistant Examiner — Alexander A Singh
(74) Attorney, Agent, or Firm — Oliff PLC

(57) ABSTRACT

A rotating electric machine includes a rotor, a stator, a temperature detecting element, and a cooling apparatus. The stator includes a stator core that is disposed so as to oppose the rotor in a radial direction of the rotating electric machine, and a stator winding that is wound around the stator core. The temperature detecting element is set in the stator winding. The cooling apparatus drips a liquid coolant onto coil end portions of the stator winding, thereby performing cooling. The stator winding has a plurality of input and output lines that are electrically connected to an external apparatus. At least one input or output line among the plurality of input and output lines is disposed vertically above the temperature detecting element.

4 Claims, 5 Drawing Sheets

COOLED STATOR WINDING WITH TEMPERATURE DETECTION ELEMENT CONFIGURATION FOR IMPROVED ACCURACY

CROSS-REFERENCE TO RELATED APPLICATION

This application is based on and claims the benefit of priority from Japanese Patent Application No. 2014-140236, filed Jul. 8, 2014, the disclosure of which is incorporated herein in its entirety by reference.

BACKGROUND

Technical Field

The present disclosure relates to a rotating electric machine that is used, for example, as an electric motor or a power generator mounted in a vehicle.

Related Art

A rotating electric machine that is used as an electric motor or a power generator in a vehicle includes a rotor and a stator. The stator has a stator core and a stator winding. The stator core is disposed so as to oppose the rotor in a radial direction. The stator winding is wound around the stator core. In the rotating electric machine such as this, when a current flows through the stator winding, the stator winding generates heat, thereby causing the temperature of the stator to rise. Therefore, when the temperature of the stator rises to a predetermined temperature or higher, for example, some of the components configuring the stator may be damaged by heat.

Therefore, as disclosed in JP-A-2008-131775, setting a temperature detecting element in the stator and detecting the temperature of the stator is publically known. In JP-A-2008-131775, the temperature detecting element is attached such that a sensor unit thereof is covered by a heat conducting portion of a metal member. Heat transmitted to the heat conducting portion is quickly conducted to the sensor unit from the periphery of the sensor unit, thereby increasing response speed. When the temperature of the stator rises and the temperature detected by the temperature detecting element reaches a predetermined temperature, in an electric motor, for example, the current supplied to the stator winding is cut off and temperature increase in the stator is prevented.

In addition, as a method for cooling the stator, using a cooling apparatus that cools the stator by dripping a liquid coolant onto the coil end portions of the stator winding that project outside from both end surfaces in an axial direction of the stator core is also publically known.

In a rotating electric machine that uses the cooling apparatus to cool the stator using a liquid coolant, when the liquid coolant that is dripped onto the coil end portions of the stator winding hits the temperature detecting element, the temperature detecting element detects the temperature of the liquid coolant rather than the temperature of the stator winding. Therefore, an error occurs between the actual temperature of the stator winding and the temperature detected by the temperature detecting element. However, to prevent heat-attributed damage to the constituent components of the stator, heat generation in the stator winding is required to be suppressed when a temperature that is lower than the usage temperature limit by an amount equivalent to the error is detected. Therefore, when the error increases, the capabilities of the rotating electric machine cannot be sufficiently realized.

To prevent the temperature detecting element from being hit with the liquid coolant, providing a coolant guiding member or the like can be considered. However, when the coolant guiding member is provided, component cost and assembly cost may increase due to this additional member, and the physical size may increase because additional installation space is required. In addition, the coolant guiding member is attached to the housing or the like of the rotating electric machine. Thus, the coolant guiding member contributes to damage caused by vibrations, and significant labor is required to confirm reliability. Furthermore, the coolant guiding member shortens a creepage distance between windings of differing phases. Thus, insulation performance may decrease.

SUMMARY

It is thus desired to provide a rotating electric machine that prevents a liquid coolant from hitting a temperature detecting element, and enables the temperature of a stator winding to be detected with higher accuracy.

An exemplary embodiment provides a rotating electric machine including: a rotor; a stator that has: i) a stator core that is disposed so as to oppose the rotor in a radial direction of the rotating electric machine; and ii) a stator winding that is wound around the stator core; a temperature detecting element that is set in the stator winding; and a cooling apparatus that drips a liquid coolant onto coil end portions of the stator winding, thereby performing cooling. The stator winding has a plurality of input and output lines that are electrically connected to an external apparatus. At least one input or output line among the plurality of input and output lines is disposed vertically above the temperature detecting element.

In the present disclosure, the stator winding has the plurality of input and output lines that are connected to external apparatuses, and at least one input or output line among the plurality of input and output lines is disposed vertically above the temperature detecting element. As a result, the liquid coolant that is dripped onto the coil end portions of the stator winding no longer hits the temperature detecting element, thereby enabling the temperature of the stator winding to be detected with higher accuracy.

The reference numbers within the parentheses following the components and parts described in the claims indicate correlations to specific components and parts described according to an embodiment, described hereafter, and do not affect in any way the configurations in the claims recited in the scope of claims.

DESCRIPTION OF EMBODIMENTS

A rotating electric machine according to an embodiment of the present disclosure will be described in detail with reference to the drawings.

First Embodiment

Figure 1:
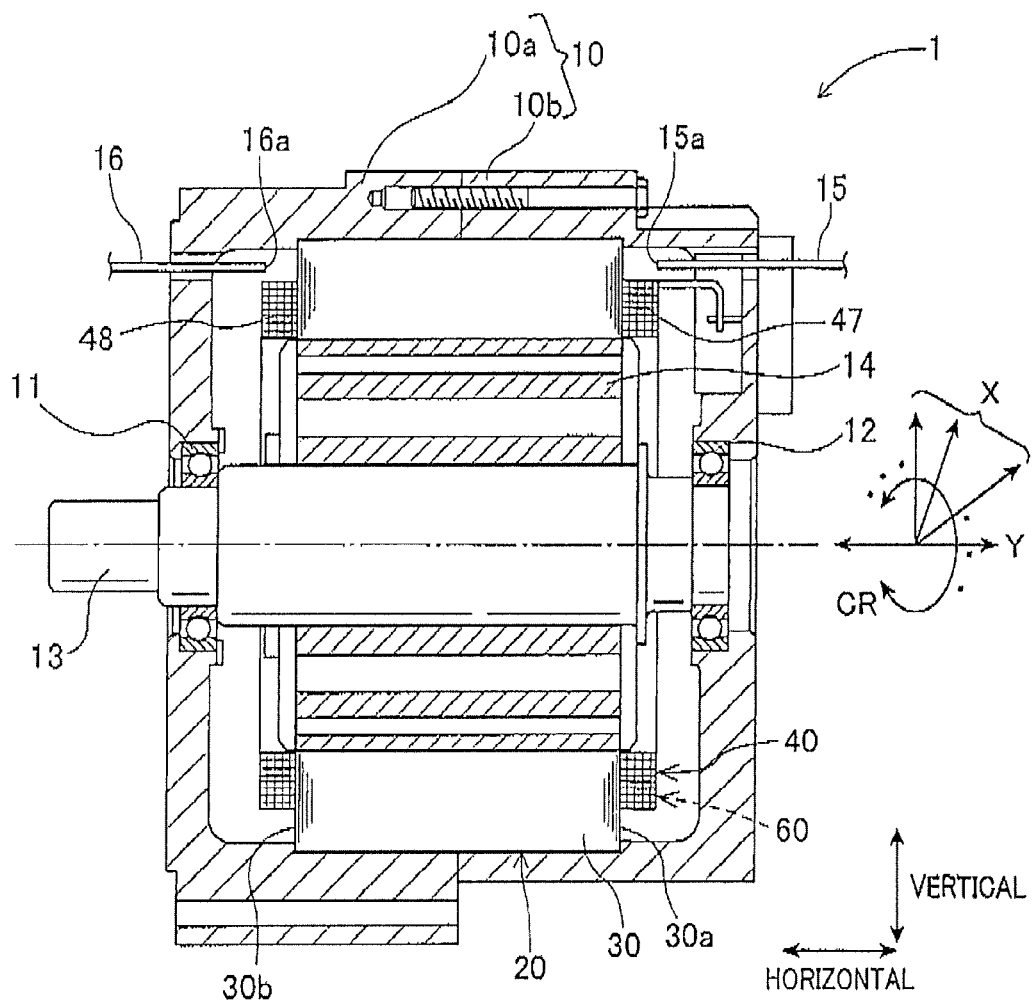
FIG. 1 is a cross-sectional view along an axial direction of a rotating electric machine according to a first embodiment.

A rotating electric machine 1 according to the present embodiment is used as a motor (electric motor) for a vehicle. As shown in FIG. 1, the rotating electric machine 1 includes a housing 10 that is composed by a pair of bottomed tube-shaped housing members 10a and 10b being joined together at respective opening portions, a rotor 14 that is fixed to a rotating shaft 13 that is rotatably supported in the housing 10 by bearings 11 and 12, and a stator 20 that is disposed so as to oppose the rotor 14 in a radial direction X of the rotating electric machine 1 on the outer side of the rotor 14.

The rotating electric machine 1 is also provided with a coolant supplying means that includes a pair of conduits 15 and 16 for supplying a liquid coolant for cooling to a stator winding 40 of the stator 20. The conduits 15 and 16 are respectively attached so as to pass through the housing members 10a and 10b, so as to communicate between the interior and exterior of the housing 10. The respective tip portions of the conduits 15 and 16 are provided with discharge openings 15a and 16a that discharge the liquid coolant. The discharge openings 15 and 16a respectively open vertically above first and second coil end portions 47 and 48 of the stator winding 40 that is housed within the housing 10.

In the rotating electric machine 1, a recovering means (not shown) for recovering the liquid coolant discharged from the discharge openings 15a and 16a onto the first and second coil end portions 47 and 48 and circulating the liquid coolant so as to be discharged again from the discharge openings 15a and 16a, a cooler (not shown) that cools the heated liquid coolant, and the like are provided midway on a circulation route. These components configure a cooling apparatus that cools the stator winding 40 (stator 20). According to the present embodiment, automatic transmission fluid (ATF) is used as the liquid coolant. However, a publicly known coolant that is conventionally used in rotating electric machines may also be used.

The rotor 14 has a plurality of permanent magnets that are disposed on the outer circumferential side facing the inner circumferential side of the stator 20, so as to be spaced apart by a predetermined distance in a circumferential direction CR of the rotating electric machine 1. The permanent magnets form a plurality of magnetic poles of which the polarities alternately differ in the circumferential direction CR. The number of magnetic poles in the rotor 14 is not limited because the quantity differs depending on the specification of the rotating electric motor. According to the present embodiment, the rotor 14 has 12 poles (six N poles and six S poles).

Figure 2:
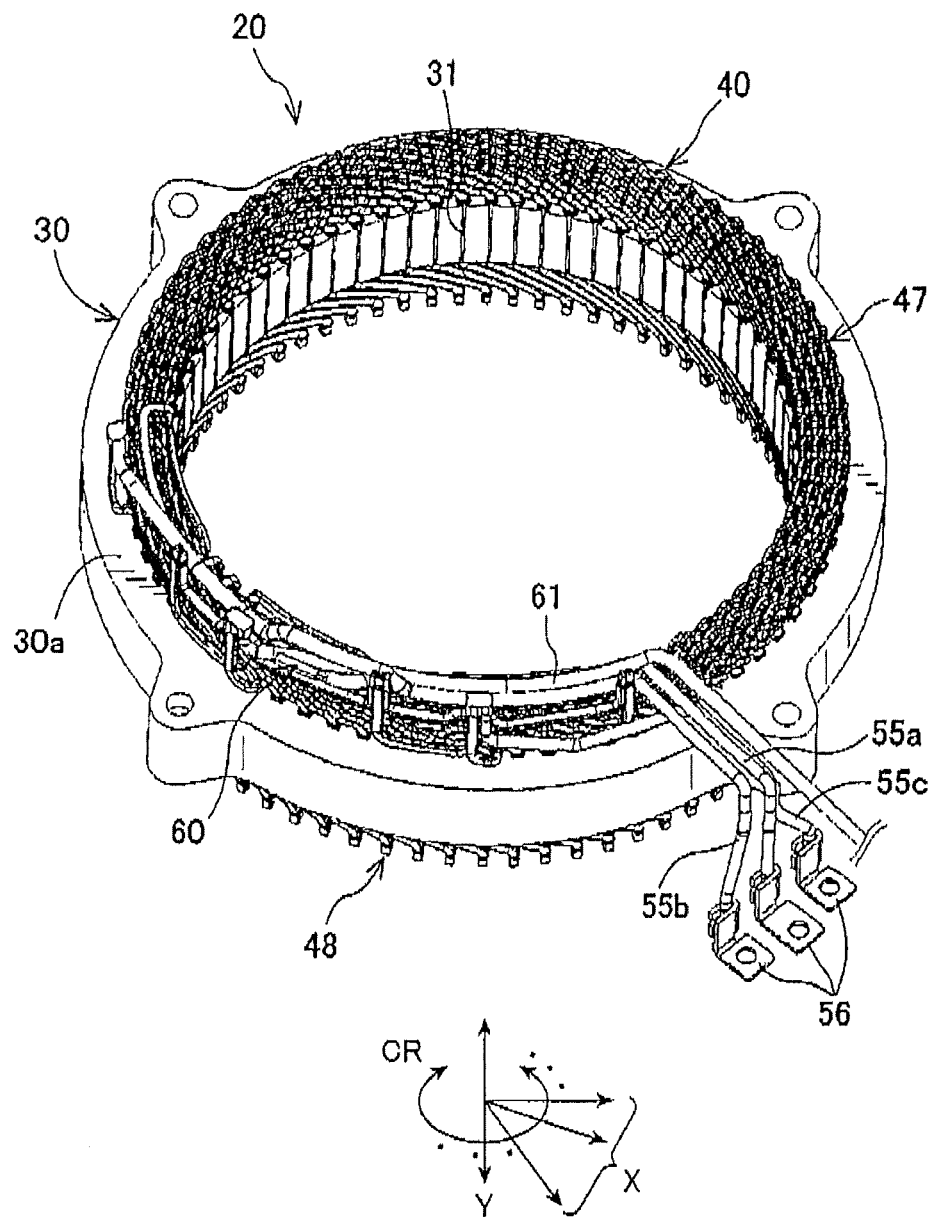
FIG. 2 is a perspective view of an overall stator according to the first embodiment.

Next, the stator 20 will be described with reference to FIG. 2 to FIG. 6. As shown in FIG. 2, the stator 20 includes an annular stator core 30 that has a plurality of slots 31 arrayed in the circumferential direction CR, and a stator winding 40 having three phases (U-phase, V-phase, and W-phase) that is wound around the stator core 30 such that end portions of a plurality of conductor segments (conductor lines) disposed so as to be inserted in the slots 31 are connected to each other on one axial-direction side of the stator core 30. In other words, the stator winding 40 according to the present embodiment is a segment type that is wound around the stator core 30 such that the plurality of approximately U-shaped conductor segments 50 are connected in a predetermined state by welding.

The stator core 30 is formed into annular shape by a plurality of electromagnetic steel plates that are laminated and fixed in an axial direction Y of the rotating electric machine 1. The plurality of slots 31 that open onto the inner circumferential surface of the stator core 30 and pass through the stator core 30 in the axial direction Y are arrayed on the inner circumferential side of the stator core 30 at even intervals in the circumferential direction CR. The number of slots 31 formed in the stator core 30 is set such that two slots 31 are formed two for each phase of the winding 40, for each magnetic pole (12 poles) of the rotor 14. According to the present embodiment, 72 slots are provided by 12×3×2=72.

The stator winding 40 that is wound around the slots 31 of the stator core 30 is configured by the plurality of approximately U-shaped conductor segments 50 being joined together by welding at the end portions on the open end side. The conductor segment 50 is formed by a flat conducting wire, composed of a conductor having a rectangular cross-section and an insulating film that covers the outer peripheral surface of the conductor, being bent into a U shape.

Figure 3:
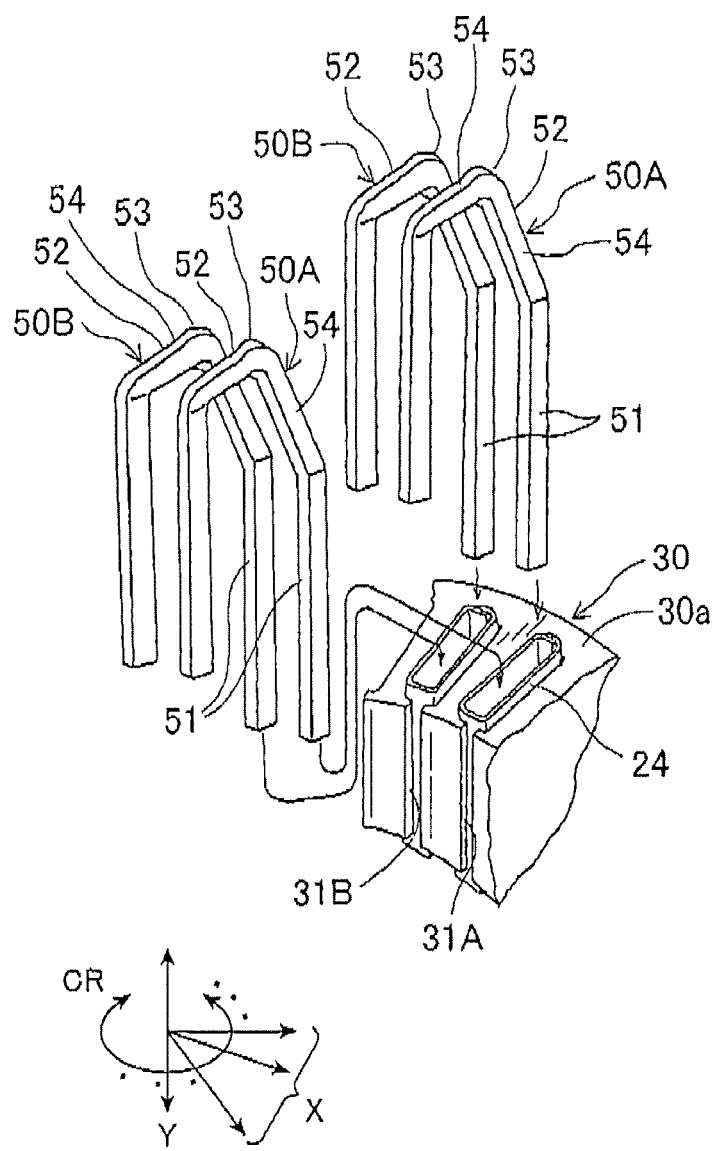
FIG. 3 is an explanatory diagram of a state in which conductor segments are inserted into slots in a stator core according to the first embodiment.

As shown in FIG. 3, the conductor segment 50, which is formed into a approximately U-shape, is composed of a pair of straight portions 51 and 51 that are parallel to each other and a turn portion 52 that connects together one end of each straight portion 51 and 51. A top stepped portion 53 that extends along an end surface 30a of the stator core 30 is provided in the center portion of the turn portion 52. On both sides of the top stepped portion 53, sloped portions 54 that slope at a predetermined angle in relation to the end surface 30a of the stator core 30 are provided. An insulator 24 provides electrical insulation between the stator core 30 and the stator winding 40.

FIG. 3 shows two conductor segments 50A and 50B that form a pair and are disposed so as to be inserted into two slots 31A and 31B that are adjacent to each other and are of the same phase. In this case, the pair of straight portions 51 and 51 of each of the two conductor segments 50A and 50B is inserted separately into the two adjacent slots 31A and 31B from one axial-direction end side, rather than being inserted into the same slot 31. In other words, one straight portion 51 of one conductor segment 50A, of the two conductor segments 50A and 50B on the right side in FIG. 3, is inserted into the outermost layer (eighth layer) of the slot 31A, and the other straight portion 51 is inserted into a seventh layer of another slot (not shown) that is apart from the slot 31A by a single magnetic pole pitch (NS pole pitch) in the counter-clockwise direction of the stator core 30.

Then, one straight portion 51 of the other conductor segment 50B is inserted into the outermost layer (eighth layer) of the slot 31B adjacent to the slot 31A, and the other straight portion 51 is inserted into the seventh layer of another slot (not shown) that is apart from the slot 31B by a single magnetic pole pitch (NS pole pitch) in the counter-clockwise direction of the stator core 30. In other words, the two conductor segments 50A and 50B are disposed so as to be shifted by a single slot pitch in the circumferential direction CR. In this way, the straight portions 51 of an even number of conductor segments 50 are disposed so as to be inserted into all of the slots 31. According to the present embodiment, a total of eight straight portions 51 are housed in each slot 31 so as to be arrayed in a single row in the radial direction X.

The open end portions of the pair of straight portions 51 and 51 that extend from the slots 31 towards the other axial-direction end side are twisted to opposite sides in the circumstantial direction CR, so as to run diagonally at a predetermined angle on the end surface 30a of the stator core 30, thereby forming diagonal portions (not shown) each having a length that is approximately half the magnetic pole pitch. Then, on the other axial-direction end side of the stator core 30, the tip portions of predetermined diagonal portions of the conductor segments 50 are joined together by welding or the like, and electrically connected by a predetermined pattern. In other words, as a result of the predetermined conductor segments 50 being serially connected, the stator winding 40 having three phase windings (U-phase, V-phase, and W-phase) that are wound by wave winding in the circumferential direction CR along the slots 31 of the stator core 30 are formed.

For each phase of the stator winding 40, a winding (coil) that makes eight circuits in the circumferential direction CR of the stator core 40 is formed by the basic U-shaped conductor segments 50. However, for each phase of the stator winding 40, the segments connected to an output lead line (output lines 55a, 55b, and 55c (see FIG. 2) corresponding to input-output lines) and a neutral point lead line (input line (not shown)), as well as segments having a turn portion that connects the first circuit and the second circuit, . . . and the seventh circuit and the eighth circuit are each composed of an irregular-shaped segment (not shown) that differs from the basic conductor segment 50. The winding end of each phase of the stator winding 40 is connected by a Y-connection (star-connection) using these irregular-shaped segments.

A terminal member 56 (see FIG. 2) that is electrically connected to an external apparatus (not shown) is attached to the tip of each output line 55a, 55b, and 55c. The output lines 55a, 55b, and 55c are conducting wires each positioned between a phase winding and a terminal member 56. The same also applies to the input line (not shown).

As shown in FIG. 2, on the one axial-direction end side of the stator winding 40 configured as described above, an annular first coil end portion 47 is formed that is composed of a plurality of turn portions 52 of the conductor segments 50 projecting from the end surface 30a on one end side of the stator core 30 being laminated in the radial direction X. In addition, on the other axial-direction end side of the stator winding 40, an annular second coil end portion 48 is formed that is composed of a plurality of diagonal portions and welded portions of the conductor segments 50 projecting from the end surface 30b on the other end side of the stator core 30 being laminated in the radial direction X of the stator core 30.

Figure 4:
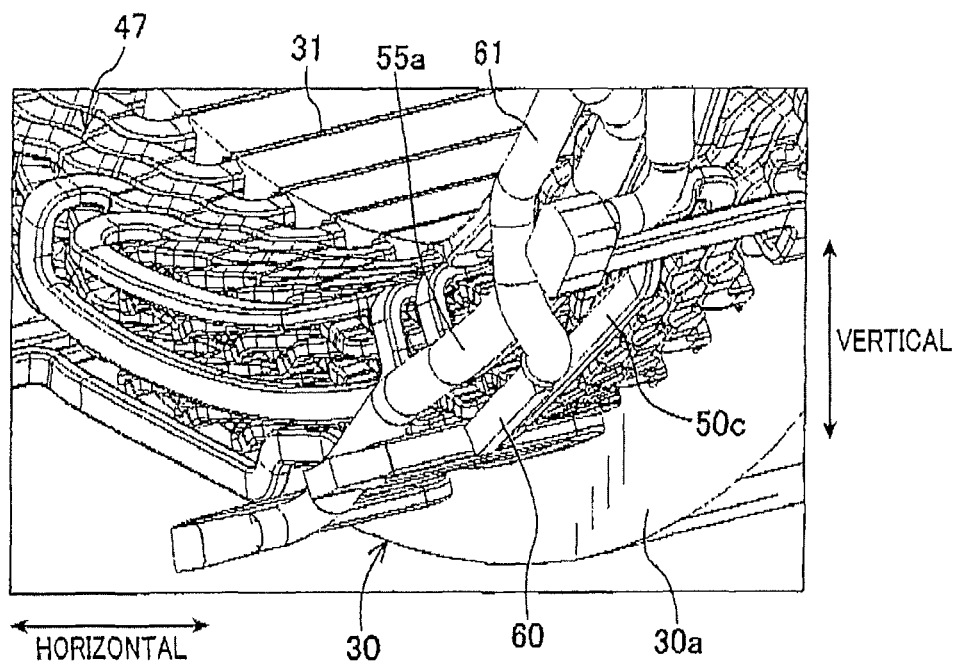
FIG. 4 is an enlarged, partial perspective view of a portion of the stator according to the first embodiment.
Figure 5:
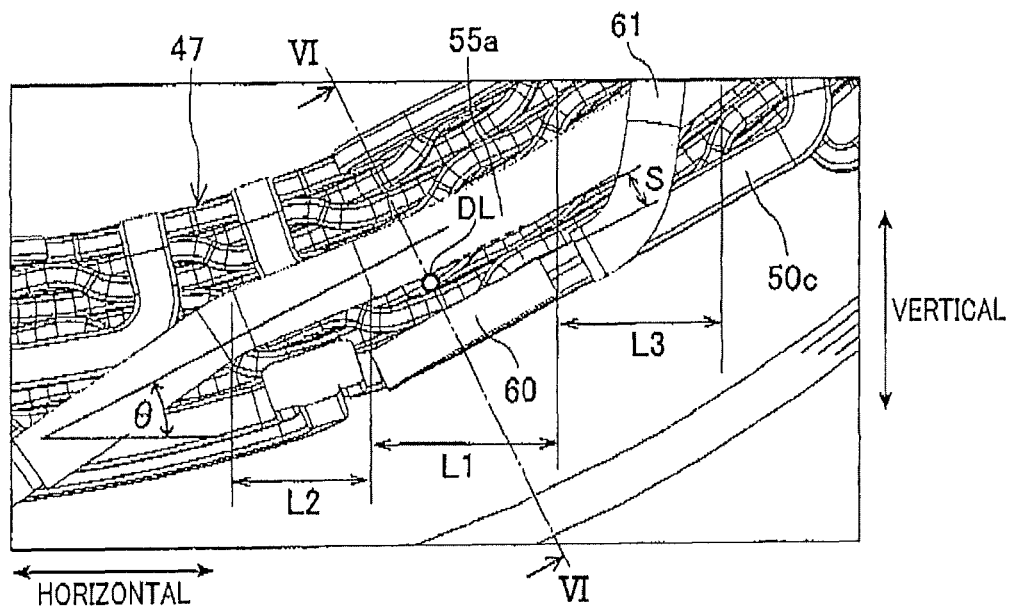
FIG. 5 is a partial front view of a portion of the stator according to the first embodiment, viewed from the axial direction.
Figure 6:
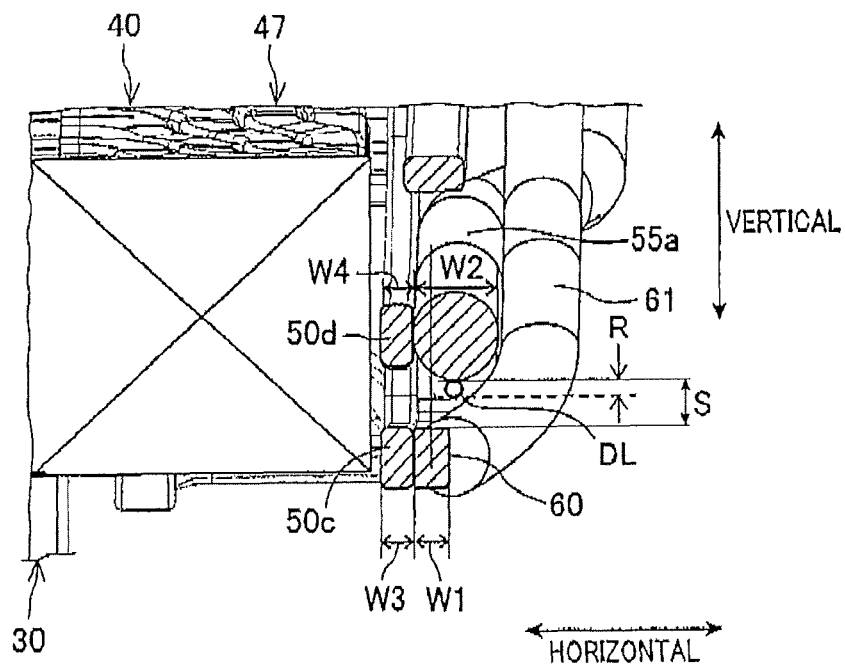
FIG. 6 is a cross-sectional view taken along line VI-VI in FIG. 5.

A thermistor 60 is set in the first coil end portion 47 as a temperature detecting element that detects the temperature of the stator winding 40. As shown in FIG. 4 to FIG. 6, the thermistor 60 is set in a lower portion (at the five o'clock position on a clock) of the annular first coil end portion 47, in relation to the stator 20 which is set so that the axial direction Y of the stator 20 is in a horizontal direction. In other words, the thermistor 60 is set in a state in which a sensor portion is in contact with a connecting wire (temperature measurement target wire) 50c positioned on the outermost circumferential side of the first coil end portion 47. The thermistor 60 is disposed so as not to be sandwiched between an input line or output line 55a disposed vertically above the thermistor 60 and the coil end portions 47, 48 of the stator winding 40.

The thermistor 60 is electrically connected to a control unit (not shown) that controls the ON and OFF of the current supplied to the stator winding 40, by wiring 61, and is configured to transmit, at all times, detected temperature information on the stator winding 40 to the control unit. When the detected temperature of the stator winding 40 transmitted from the thermistor 60 reaches a predetermined temperature, the control unit cuts off the current supplied to the stator winding 40 and prevents temperature increase in the stator 20.

One output line 55a, among the three output lines 55a, 55b, and 55c electrically connected to the external apparatus (not shown), is disposed vertically above the thermistor 60 such that the liquid coolant dripped onto the first coil end portion 47 does not directly hit the thermistor 60. In this case, as shown in FIG. 5, the output line 55a disposed vertically above the thermistor 60 extends in a approximately straight manner at a slope of a predetermined angle θ in relation to the horizontal direction. In addition, the thermistor 60 and the output line 55a disposed vertically above the thermistor 60 are arranged so as to be parallel to each other with predetermined space S formed therebetween.

The space S between the thermistor 60 and the output line 55a is formed to be a size preventing a droplet (drop) DP of liquid coolant from coming into contact with the thermistor 60 when the liquid coolant that is attached to the sloped output line 55a forms a droplet DP and runs downward at an angle along the output line 55a (e.g., as shown in FIGS. 5 and 6, the space S is set to be larger than a size R of a droplet DP).

The output line 55a that is disposed vertically above the thermistor 60 overlaps the thermistor 60 over an overall area in a longitudinal direction and a width direction of the thermistor 60 when viewed from vertically above the output line 55a. In other words, as shown in FIG. 5, the output line 55a overlaps the thermistor 60 over the overall area of the length dimension L1 in the longitudinal direction of the thermistor 60. The straight portion of the output line 55a disposed vertically above the thermistor 60 is longer than the length dimension L1 in the longitudinal direction of the thermistor 60 and projects from both sides in the longitudinal direction of the thermistor 60 by predetermined lengths L2 and L3.

In addition, as shown in FIG. 6, the output line 55a disposed vertically above the thermistor 60 overlaps the thermistor 60 over the overall area of a width dimension W1 in the width direction of the thermistor 60, and has a width dimension W2 that is approximately 2.5 times the width dimension W1 of the thermistor 60. In this case, the output line 55a is disposed so as to be in contact with a connecting wire 50d that is disposed vertically above the connecting wire 50c to which the thermistor 60 is set. As a result, the thermistor 60 is disposed so as to be positioned within an area that is the total width dimension of the width dimension W2 of the output line 55a and a width dimension W4 of the connecting wire 50d. The output line 55a and the connecting wire 50d that are disposed vertically above the thermistor 60 are preferably disposed in an area that is about three times the total width dimension of the width dimension W1 of the thermistor 60 and the width dimension W3 of the connecting wire 50c.

Next, the working of the rotating electric machine 1 according to the present embodiment configured as described above will be described. When operation is started as a result of the stator winding 40 of the stator 20 being energized, in the rotating electric machine 1 according to the present embodiment, the rotating shaft 13 rotates with the rotation of the rotor 14 and driving force is supplied from the rotating shaft 13 to other equipment. At this time, the stator winding 40 generates heat as a result of energization, and then, the thermistor 60 disposed in the first coil end portion 47 of the stator winding 40 detects the temperature of the stator winding 40 and transmits information on the detected temperature to the control unit at all times.

In addition, the cooling apparatus is started simultaneously with the start of operation of the rotating electric machine 1, and the liquid coolant for cooling is discharged from the discharge openings 15a and 16a of the conduits 15 and 16 onto the first and second coil end portions 47 and 48. The liquid coolant that is discharged from the discharge openings 15a and 16a drips from above onto the outer circumferential surfaces of the first and second coil end portions 47 and 48 of the stator winding 40.

The liquid coolant that has dripped onto the first coil end portion 47 flows downward along the conducting wire of the first coil end portion 47 and cools the stator winding 40 that is generating heat due to energization. At this time, the output line 55a that is disposed vertically above the thermistor 60 so as to overlap the thermistor 60 over the overall area in the longitudinal direction and width direction of the thermistor 60 functions as a cover, thereby preventing the liquid coolant that is flowing downward from directly hitting the thermistor 60.

In addition, the output line 55a is sloped at the predetermined angle θ in relation to the horizontal direction. Thus, the liquid coolant that is attached to the output line 55a flows downward at an angle along the sloped output line 55a, and therefore, does not attach to the thermistor 60. As a result, the temperature of the heat-generating stator winding 40 can be detected with higher accuracy. Furthermore, the space S is formed between the thermistor 60 and the output line 55a disposed vertically above the thermistor 60. Thus, the liquid coolant that is attached to the output line 55a flows downward at a slope along the sloped output line 55a, and therefore, does not form a droplet DP that falls onto the thermistor 60.

As described above, in the rotating electric machine 1 according to the present disclosure, the stator winding 40 is configured such that one output line 55a, among the plurality of output lines 55a, 55b, and 55c that are connected to the external apparatus (not shown), is disposed vertically above the thermistor 60. Therefore, the liquid coolant that is dripped onto the first coil end portion 47 of the stator winding 40 does not directly hit the thermistor 60. Consequently, the temperature of the stator winding 40 that is generating heat due to energization can be detected with higher accuracy. As a result, the determination criteria for current restriction applied by the control unit that controls the ON and OFF of the current supplied to the stator winding 40 based on the temperature detection results from the thermistor 60 can be improved, thereby facilitating the realization of better motor performance.

In addition, to prevent the liquid coolant from hitting the thermistor 60, a special member such as a coolant guide is not required. Therefore, increases in cost and physical size do not occur, and confirmation of reliability is also not required. Furthermore, a special member is not required to be provided. Thus, shortening of the creepage distance between windings of different phases does not occur.

In addition, according to the present embodiment, the output line 55a that is disposed vertically above the thermistor 60 overlaps the thermistor 60 over the overall area in the longitudinal direction and width direction of the thermistor 60, when viewed from vertically above the output line 55a. Therefore, the liquid coolant can be prevented from hitting the thermistor 60 with certainty.

In addition, according to the present embodiment, the predetermined space S is formed between the thermistor 60 and the output line 55a that is disposed vertically above the thermistor 60. Therefore, insulation can be ensured between the 12-volt system thermistor 60 and the high-voltage system motor wires.

In addition, according to the present embodiment, the output line 55a that is disposed vertically above the thermistor 60 is sloped at a predetermined angle θ in relation to the horizontal direction. Therefore, the liquid coolant that is attached to the output line 55a can flow downward at an angle along the sloped output line 55a, thereby preventing the liquid coolant from attaching onto the thermistor 60. As a result, the temperature of the stator winding 40 that is generating heat can be detected with higher accuracy. Furthermore, the space S is formed between the thermistor 60 and the output line 55a that is disposed vertically above the thermistor 60. Thus, the liquid coolant that is attached to the output line 55a can flow along the sloped output line 55a with certainty, without forming a droplet DP that falls on the thermistor 60.

Other Embodiments

The present disclosure is not limited to the above-described embodiment and can be modified in various ways without departing from the spirit of the present disclosure.

For example, according to the above-described embodiment, one output line 55a, among the three output lines 55a, 55b, and 55c, is disposed vertically above the thermistor 60. However, two or more output lines, among the three output lines 55a, 55b, and 55c, may be disposed vertically above the thermistor 60. In addition, the input line may be disposed vertically above the thermistor 60, instead of or in addition to the output lines 55a, 55b, and 55c. In the present disclosure, as a result of a larger number of input-output lines being disposed vertically above the thermistor 60, the liquid coolant that is dripped onto the first coil end portion 47 of the stator winding 60 can be made more unlikely to hit the thermistor 60.

According to the present embodiment, an example is given in which the rotating electric machine of the present disclosure is applied to a motor (electric motor). However, as a rotating electric machine that is mounted in a vehicle, the present disclosure may also be used as an electric motor, a power generator, or a rotating electric motor that can be selectively used as both the electric motor and the power generator.

What is claimed is:
1. A rotating electric machine comprising:
   a rotor;
   a stator that includes
      a stator core that is disposed so as to oppose the rotor in a radial direction of the rotating electric machine, and
      a stator winding that is wound around the stator core;
   a temperature detecting element that is set in the stator winding; and a cooling apparatus that drips a liquid coolant onto coil end portions of the stator winding, thereby performing cooling, wherein:

the stator winding has a plurality of input or output lines that are electrically connected to an external apparatus;

at least one input or output line among the plurality of input or output lines is disposed vertically above the temperature detecting element and in non-contact with the temperature detecting element; and the temperature detecting element is disposed so as not to be sandwiched between the at least one input or output line and the coil end portions of the stator winding; and the at least one input or output line that is disposed vertically above the temperature detecting element overlaps the temperature detecting element over an overall area in a longitudinal direction and a width direction of the temperature detecting element when viewed from vertically above the at least one input or output line.

2. The rotating electric machine according to claim 1, wherein a space is formed between the temperature detecting element and the at least one input or output line that is disposed vertically above the temperature detecting element.

3. The rotating electric machine according to claim 2, wherein the at least one input or output line that is disposed vertically above the temperature detecting element is sloped in relation to a horizontal direction.

4. The rotating electric machine according to claim 1, wherein the at least one input or output line that is disposed vertically above the temperature detecting element is sloped in relation to a horizontal direction.

* * * * *